(12) United States Patent
Palm et al.

(10) Patent No.: US 7,303,100 B2
(45) Date of Patent: Dec. 4, 2007

(54) KETTLE HAVING MOVABLE SPOUT LID AND ACTUATOR

(75) Inventors: William J. Palm, Newtonville, MA (US); James Wilson, Norwood, MA (US); John Costello, Wellesley, MA (US); Richard G. Groth, Elgin, IL (US)

(73) Assignee: WKI Holding Company, Inc., Reston, VA (US)

( * ) Notice: Subject to any disclaimer, the term of this patent is extended or adjusted under 35 U.S.C. 154(b) by 229 days.

(21) Appl. No.: 10/894,874

(22) Filed: Jul. 20, 2004

(65) Prior Publication Data
US 2006/0016834 A1    Jan. 26, 2006

(51) Int. Cl.
*A47G 19/00* (2006.01)
*B65D 83/00* (2006.01)

(52) U.S. Cl. .............. 222/470; 222/472; 222/474; 222/505; 222/511; 222/517

(58) Field of Classification Search ............ 222/472, 222/473, 470, 471, 474, 505, 511, 517
See application file for complete search history.

(56) References Cited

U.S. PATENT DOCUMENTS

| 65,757 | A | * | 6/1867 | Fitcher .................... 222/473 |
|---|---|---|---|---|
| 1,173,989 | A | | 2/1916 | Thalman et al. |
| 1,193,157 | A | * | 8/1916 | Krause et al. ......... 222/189.01 |
| 1,486,802 | A | | 3/1924 | Royse |
| 1,576,811 | A | | 3/1926 | Clark |
| 1,646,154 | A | | 10/1927 | Kroll |
| 1,658,645 | A | | 2/1928 | McGee |
| 1,938,527 | A | | 12/1933 | Marelli |
| 1,954,983 | A | | 4/1934 | Brown |
| D95,354 | S | | 4/1935 | Kircher |
| 2,014,582 | A | | 9/1935 | Putz |
| 2,169,239 | A | | 8/1939 | Hacmac |
| 2,276,917 | A | | 3/1942 | Bernhardt |
| D152,461 | S | | 1/1949 | Humphrey et al. |
| 2,501,142 | A | | 3/1950 | Reichart |
| 2,574,876 | A | | 11/1951 | Lebus |
| 2,590,596 | A | | 3/1952 | Ziskin et al. |
| 2,620,948 | A | * | 12/1952 | Ziskin et al. ............ 222/473 |
| 2,624,493 | A | | 1/1953 | Porter |
| 2,638,253 | A | | 5/1953 | Mueller |
| 2,666,556 | A | | 1/1954 | Ziskin et al. |
| 2,670,107 | A | * | 2/1954 | Welden .................... 222/474 |
| 2,696,332 | A | | 12/1954 | Felver |

(Continued)

FOREIGN PATENT DOCUMENTS

GB        607046 A        8/1948

*Primary Examiner*—Kevin Shaver
*Assistant Examiner*—Stephanie E. Tyler
(74) *Attorney, Agent, or Firm*—Wolf, Greenfield & Sacks, P.C.

(57) ABSTRACT

A kettle for heating water or other liquid has a lid and lid actuator to move the lid between open and closed positions. The lid actuator may be connected to the container and movable relative to the opening about a pivot that is below a pivot about which the lid may move between the closed and open positions. The lid actuator may also lock the lid in position, such as in the open or closed position. The lid and lid actuator may also be arranged for movement independent of each other.

32 Claims, 4 Drawing Sheets

U.S. PATENT DOCUMENTS

| | | |
|---|---|---|
| 2,748,997 A | 6/1956 | Richmond, Sr. |
| 3,130,881 A | 4/1964 | Jepson |
| 3,341,088 A | 9/1967 | Moynihan |
| 3,469,747 A | 9/1969 | Richmond, Jr. |
| D221,062 S | 7/1971 | Huthsing, Jr. |
| 3,591,060 A | 7/1971 | Nakamura |
| 3,848,563 A | 11/1974 | Brown |
| 3,851,791 A | 12/1974 | Flider |
| 3,954,203 A | 5/1976 | Jorgenson et al. |
| 4,026,274 A | 5/1977 | Gutierrez |
| 4,069,751 A | 1/1978 | Gronwick et al. |
| 4,123,871 A | 11/1978 | Knott |
| 4,141,473 A | 2/1979 | Hudson |
| 4,155,349 A | 5/1979 | Hudson |
| 4,189,016 A | 2/1980 | Nicol |
| 4,203,529 A | 5/1980 | Torassa et al. |
| 4,261,328 A | 4/1981 | Kirk |
| 4,385,585 A | 5/1983 | Lebowitz |
| 4,430,556 A | 2/1984 | Inskip |
| 4,470,220 A | 9/1984 | Sudo |
| 4,491,251 A | 1/1985 | Pratz |
| 4,550,027 A | 10/1985 | Stone |
| 4,614,859 A | 9/1986 | Beckering |
| 4,624,385 A | 11/1986 | Yano |
| D288,518 S | 3/1987 | Lebowitz |
| 4,648,535 A | 3/1987 | Zimmerman |
| 4,667,584 A | 5/1987 | Koyama |
| 4,735,191 A | 4/1988 | Boursse |
| 4,744,183 A | 5/1988 | Kruger |
| 4,759,274 A | 7/1988 | Schmidt |
| 4,768,989 A | 9/1988 | Moomaw |
| 4,773,563 A | 9/1988 | Taylor |
| 4,813,368 A | 3/1989 | Hutter |
| D302,511 S | 8/1989 | Porcelli |
| 4,857,897 A | 8/1989 | Chen |
| 4,873,918 A | 10/1989 | Goldman |
| 4,921,146 A | 5/1990 | Salzmann |
| D308,314 S | 6/1990 | Ancona |
| D308,315 S | 6/1990 | Ancona |
| D308,810 S | 6/1990 | Murawski |
| D311,839 S | 11/1990 | Hutter |
| 5,037,015 A | 8/1991 | Collins |
| 5,065,884 A | 11/1991 | Naritomi |
| 5,072,858 A | 12/1991 | Brashier |
| 5,135,128 A | 8/1992 | Kuhn |
| 5,171,952 A | 12/1992 | Waligorski |
| D336,006 S | 6/1993 | Lebowitz |
| D342,640 S | 12/1993 | Lebowitz |
| 5,294,014 A | 3/1994 | Wyatt |
| D352,419 S | 11/1994 | Lin |
| 5,413,257 A | 5/1995 | Amberger |
| D360,101 S | 7/1995 | Lee |
| 5,490,616 A | 2/1996 | Stowell |
| D373,499 S | 9/1996 | Piret |
| 5,582,316 A | 12/1996 | Masayoshi |
| 5,588,567 A | 12/1996 | Yeh |
| 5,615,808 A | 4/1997 | Huang |
| D380,337 S | 7/1997 | Lien |
| D381,859 S | 8/1997 | Joergensen |
| 5,653,362 A | 8/1997 | Patel |
| 5,672,274 A | 9/1997 | Wheeler |
| 5,690,094 A | 11/1997 | Sheinfeld |
| 5,693,244 A | 12/1997 | Pragt |
| 5,706,985 A | 1/1998 | Feer |
| 5,793,020 A | 8/1998 | O'Neill |
| D400,709 S | 11/1998 | Chang |
| D402,154 S | 12/1998 | Joergensen |
| 5,873,476 A | 2/1999 | Takahashi |
| 5,875,941 A | 3/1999 | Hsu |
| 5,881,484 A | 3/1999 | Carroll |
| 5,921,425 A | 7/1999 | Markey |
| 5,944,224 A | 8/1999 | Hodge |
| 5,947,343 A | 9/1999 | Horstmann |
| 6,006,959 A | 12/1999 | Naden |
| 6,050,446 A | 4/2000 | Lei |
| D425,400 S | 5/2000 | Geringer |
| 6,095,366 A | 8/2000 | Sova |
| 6,216,903 B1 | 4/2001 | Hirose |
| 6,269,984 B1 * | 8/2001 | Murakami .................. 222/472 |
| 6,298,773 B1 | 10/2001 | Cali |
| 6,352,166 B1 | 3/2002 | Copeland |
| 6,377,750 B1 | 4/2002 | Scott |
| 6,390,014 B1 | 5/2002 | Ghidini |
| 6,398,083 B2 | 6/2002 | Nybakke |
| D459,937 S | 7/2002 | Thurlow |
| 6,474,493 B1 | 11/2002 | Lacout |
| 6,520,380 B1 | 2/2003 | Veltrop |
| 6,540,120 B2 | 4/2003 | Lebowitz |
| D478,243 S | 8/2003 | Lebowitz |
| D478,768 S | 8/2003 | Belton |
| D483,600 S | 12/2003 | Thurlow |
| 2003/0019889 A1 | 1/2003 | Lebowitz |

* cited by examiner

KETTLE HAVING MOVABLE SPOUT LID AND ACTUATOR

RELATED APPLICATIONS

This application is related to co-pending application Ser. No. 10/895,029, filed Jul. 20, 2004, entitled KETTLE HAVING OFFSET OPENING AND RECESSED LID, and application Ser. No. 10/895,028, filed Jul. 20, 2004, entitled KETTLE HAVING SPOUT LINER AND SPOUT JACKET. These applications are hereby incorporated by reference in their entirety.

BACKGROUND OF INVENTION

1. Field of Invention

This invention relates to a kettle for heating liquid, such as water.

2. Description of Related Art

Tea kettles are widely used for heating a liquid, such as water, on a stovetop or other heat source. Some tea kettles have a built-in heat source, such as an electric resistance heating element, and need not be heated by an external heat source. Regardless of the heating mechanism, water or other liquid must be placed in the kettle for heating. In some kettles, water is introduced into the kettle through a spout that is also used to dispense the water from the kettle. Other kettles have an opening separate from the spout that is used for filling the kettle. Often, the spout opening is covered by a lid that has a whistle or other noise making feature that indicates when the water in the kettle is sufficiently heated. The lid in some kettles is manually removed from the spout; in others a mechanism is provided to open and close the lid.

SUMMARY OF INVENTION

In one aspect of the invention, a kettle includes a container constructed and arranged to hold an amount of liquid. The container may have a substantially flat bottom portion, and a spout may be connected to the container. The spout may have an opening and be constructed and arranged to allow liquid to be poured from the container through the opening. A lid may be connected to the container and movable relative to the opening about a first pivot. The lid may be movable between a closed position to at least partially cover the opening and an open position to at least partially uncover the opening. A lid actuator may be connected to the container and be movable relative to the opening about a second pivot between positions to cause the lid to move between the closed and/or open positions. A first perpendicular distance between the substantially flat bottom and the first pivot may be greater than a second perpendicular distance between the substantially flat bottom and the second pivot.

In one aspect of the invention, a kettle includes a container constructed and arranged to hold an amount of liquid. The container may have a substantially flat bottom portion, and a spout may be connected to the container. The spout may have an opening and be constructed and arranged to allow liquid to be poured from the container through the opening. A lid may be connected to the container and movable relative to the opening between a closed position to at least partially cover the opening and an open position to at least partially uncover the opening. A lid actuator may be connected to the container and be movable relative to the opening between positions to cause the lid to move between the closed and open positions. The lid actuator may be capable of movement independent of the lid, i.e., the lid actuator may be moved without causing movement of the lid.

In another aspect of the invention, the lid is pivotally mounted to the spout and the lid actuator is pivotally mounted to the spout.

In another aspect of the invention, the kettle may have a handle connected to the container that is constructed and arranged to be gripped by a human hand and allow carrying of the container while holding the amount of liquid. The lid actuator may be positioned between the handle and a top portion of the container. The lid actuator may be arranged so as to lock the lid in the open position.

In one aspect of the invention, a kettle includes a container constructed and arranged to hold an amount of liquid. The container may have a substantially flat bottom portion, and a spout may be connected to the container. The spout may have an opening and be constructed and arranged to allow liquid to be poured from the container through the opening. A lid may be connected to the container and movable relative to the opening about a first pivot. The lid may have a cover portion to at least partially cover the opening and a contact portion with the first pivot being positioned between the cover portion and the contact portion. The lid may be movable between a closed position in which the cover portion at least partially covers the opening and an open position in which the cover portion at least partially uncovers the opening. A lever, having a handle portion and an engagement portion, may be connected to the container and movable relative to the opening about a second pivot. The second pivot may be positioned between the handle portion and the engagement portion. The engagement portion of the lever may be uncoupled from the contact portion of the lid, and movement of the handle portion of the lever may cause the engagement portion to engage with and move the contact portion, thereby causing the lid to move between the closed and open positions.

Various other aspects of the invention will be apparent and/or obvious from the following detailed description. It should be noted that when incorporated in a particular embodiment, various aspects of the invention may be combined and used together, or may be used separately from other aspects of the invention.

BRIEF DESCRIPTION OF THE DRAWINGS

Various aspects of the invention are described below with reference to the following drawings, in which like numerals reference like elements, and wherein.

DETAILED DESCRIPTION

Aspects of the invention are described below with reference to illustrative embodiments. However, it should be understood that aspects of the invention are not limited to those embodiments described below, but instead may be used in any suitable arrangement. For example, a kettle having an approximately cylindrical shape and rounded top is shown in the drawings, but a kettle in accordance with various aspects of the invention may have any size, shape or other configuration. Moreover, the kettle shown in the illustrative embodiments has an opening for filling the kettle in addition to the opening provided by the spout. Aspects of the invention may be used in kettles having only a spout opening.

As used herein, movement of a part "between" to points is intended to include movement in either or both directions between the points as well as movement that includes or does not include movement to the points. For example, movement of a lid between open and closed positions includes movement from the open to the closed position, from the closed to the open position, and movement in either direction between, but not including to, the open and closed positions.

In one aspect of the invention, a lid may be movable about a first pivot between closed and open positions to cover and uncover a spout opening. A lid actuator may be movable about a second pivot to cause the lid to move between the closed and open positions. The second pivot may be positioned below the first pivot, i.e., closer to the bottom of the kettle than the first pivot. Such an arrangement may provide for a more compact arrangement and/or allow for the lid actuator to be positioned beneath a carrying handle of the kettle. Locating at least a portion of the lid actuator below the handle may allow a user to comfortably and naturally lift the kettle while simultaneously engaging the lid actuator and causing the lid to move to the open position.

In another aspect of the invention, the lid actuator may be capable of movement independent of the lid. Such an arrangement may allow a user to move the lid actuator and/or the lid independent of the other, e.g., allow a user to open the lid without using the lid actuator to fill the kettle and/or to close the lid without using the lid actuator.

In another aspect of the invention, the lid actuator may be capable of locking the lid in the closed and/or open position. For example, a user may use the lid actuator to move the lid to the open position and lock the lid in the open position so the lid remains open even when the user no longer contacts the lid actuator. This feature may allow the user to keep the lid open while filling or pouring from the spout.

Figure 1:
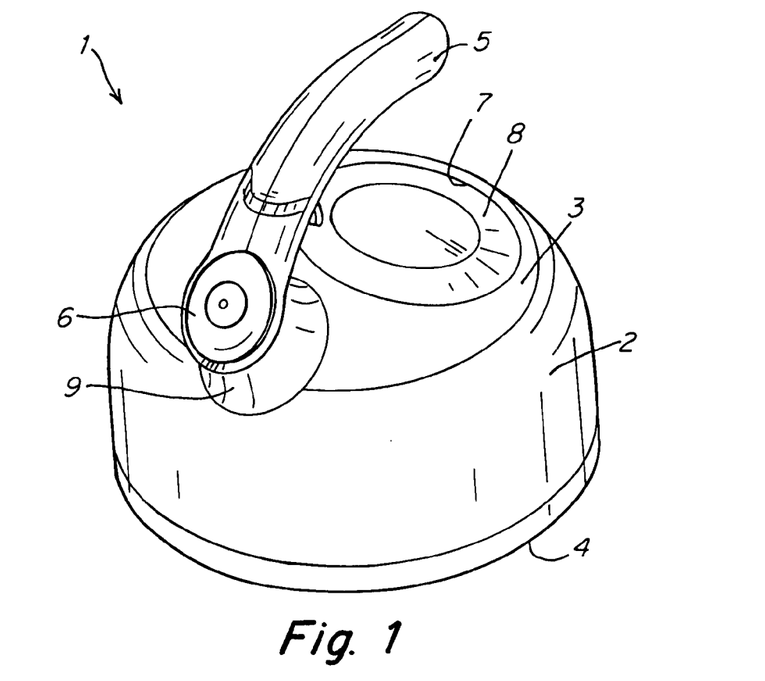
FIG. 1 is a perspective view of an illustrative embodiment incorporating various aspects of the invention.
Figure 2:
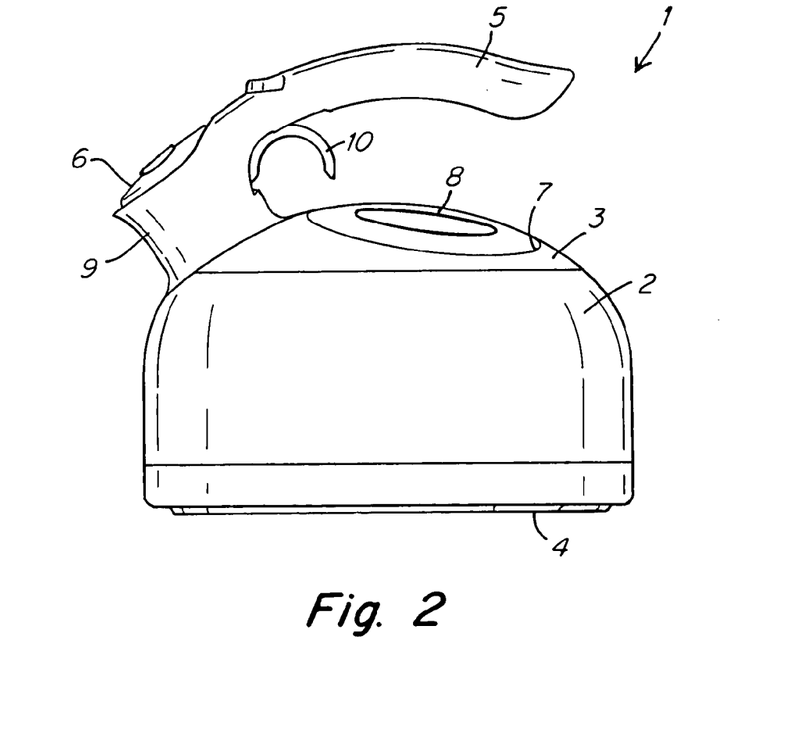
FIG. 2 is a side view of the FIG. 1 embodiment.

FIGS. 1 and 2 show an illustrative embodiment that incorporates several aspects of the invention. As can be seen in FIG. 1, this illustrative embodiment of a tea kettle 1 includes a container 2 to hold liquid for heating by an external heat source, such as a stove top, although in other aspects of the invention the kettle may have its own heat source. The container 2 may have a substantially flat bottom portion 4 and a top portion 3. Although optional, this illustrative embodiment includes an opening 7 in the top portion 3 through which water or other liquid may enter the container 2. A cap 8 may removably cover the opening 7. A handle 5 may extend over the top portion 3 of the kettle and provide a user with a gripping surface to lift and carry the kettle, although the handle may be arranged in other ways, such as on the kettle side. In this embodiment, the handle 5 extends from a spout 9 which has an opening through which liquid in the container may be poured, but the handle may be separate from the spout 9. A lid 6 may be movable to selectively cover and uncover (at least partially) the spout opening. Movement of the lid 6 may be controlled by movement of a lid actuator 10.

Figure 3:
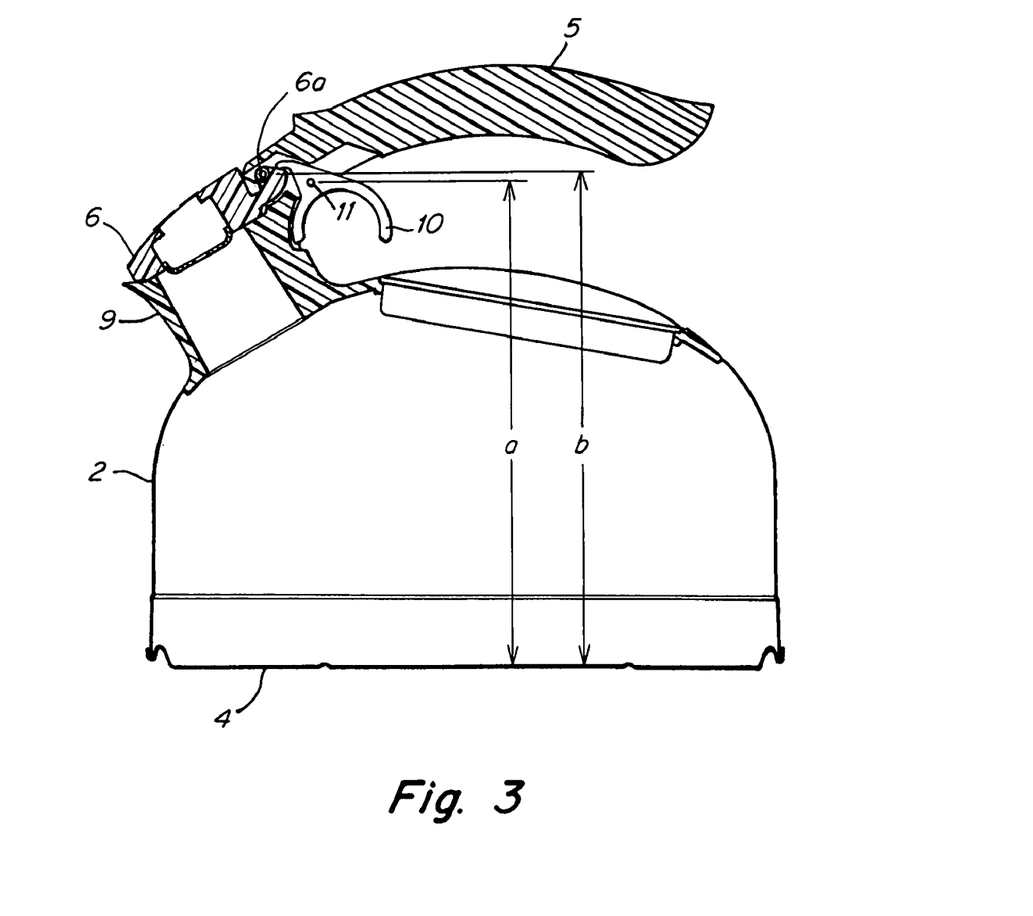
FIG. 3 is a cross-sectional side view showing the lid in a closed position.
Figure 4:
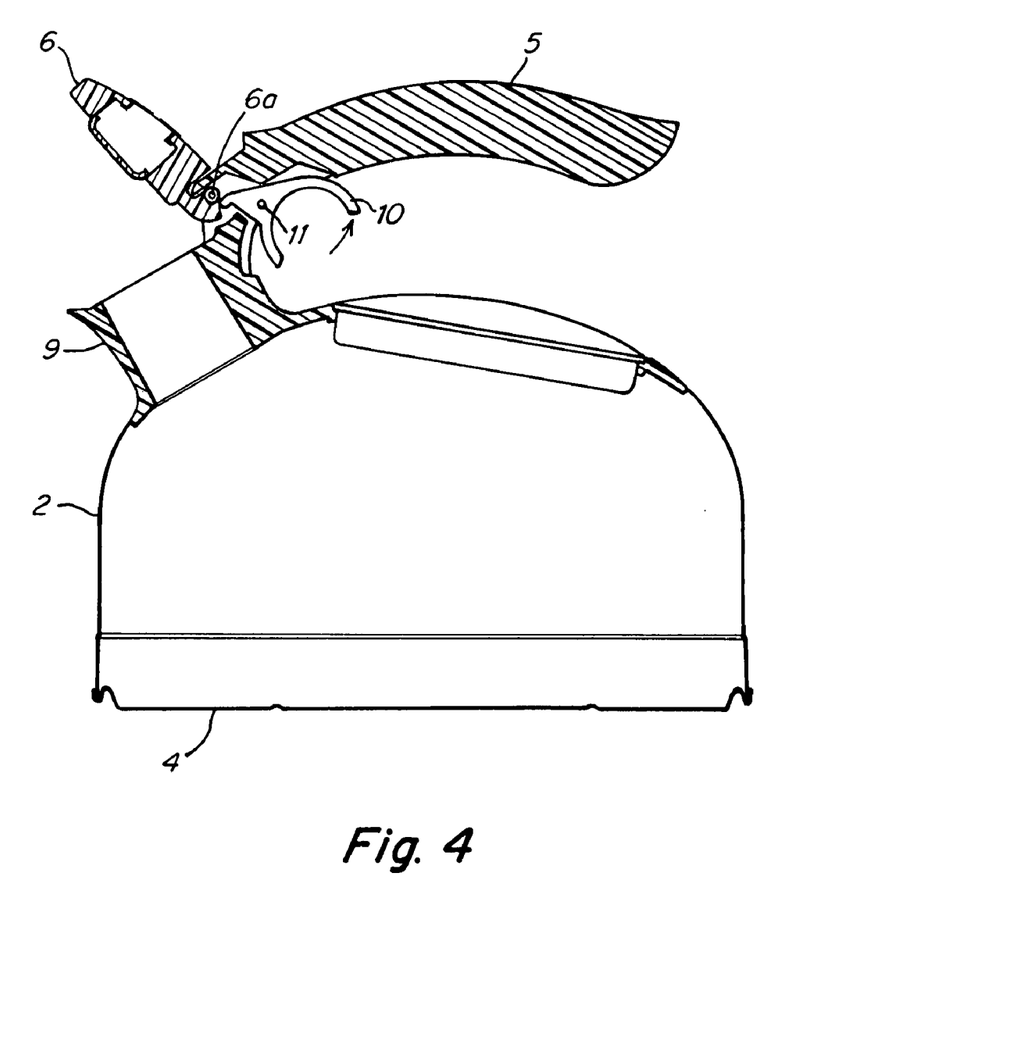
FIG. 4 is a cross-sectional side view showing the lid in an open position.

In one aspect of the invention, a pivot point for the lid actuator 10 may be positioned below a pivot point for the lid. As can be seen, for example, in FIG. 3, the pivot 11 around which the lid actuator 10 is movable may be positioned below the pivot 6a for the lid 6. That is, a perpendicular distance a from the bottom portion 4 to the pivot 11 may be less than a perpendicular distance b from the bottom portion 4 to the pivot 6a. In this arrangement, the lid 6 may be in a closed position as shown in FIG. 3 with the lid actuator 10 in a clockwise position. When a user engages the lid actuator 10, e.g., by grabbing the handle portion or finger loop of the lid actuator 10 when lifting the kettle by the handle 5 and rotating the lid actuator 10 counterclockwise, the lid actuator 10 causes the lid 6 to move about the pivot 6a to an open position as shown in FIG. 4. The user may again close the lid 6 by rotating the lid actuator clockwise, allowing the lid 6 to close by the force of gravity and/or a spring bias.

In another aspect of the invention, the lid actuator and the lid may be arranged to be capable of movement independent of the other. For example, the lid may be opened and closed by a user manipulating the lid itself and moving it to the open or closed position. Such movement of the lid may not require any movement of the lid actuator. Similarly, the lid actuator 10 may be moved separately from the lid 6. As can be seen, for example, in FIG. 4, if the lid 6 is held in the open position, the lid actuator 10 may be rotated clockwise since the lid 6 and the lid actuator 10 are not coupled so as to require movement together. This arrangement may allow a user to open or close the lid 6 without using the lid actuator.

Figure 5:
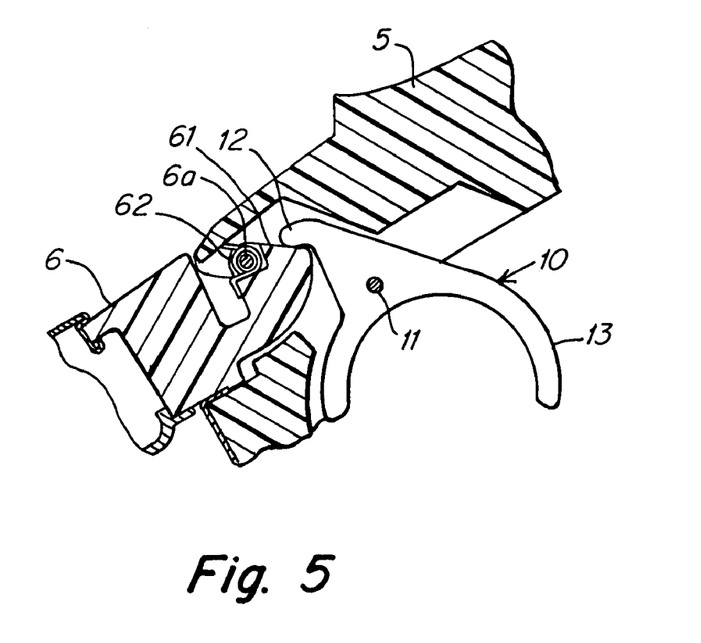
FIG. 5 is a close-up view of the lid in the closed position.
Figure 6:
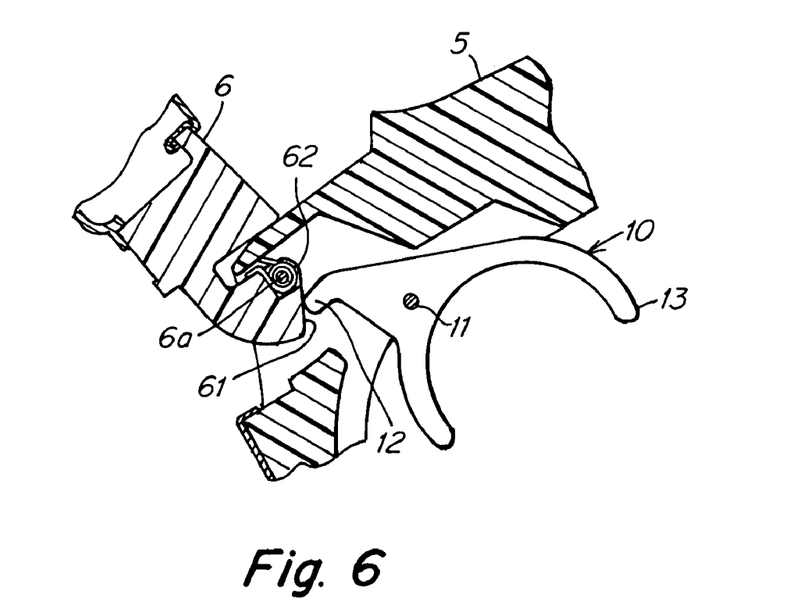
FIG. 6 is a close-up view of the lid in the open position.

FIGS. 5 and 6 show a close-up view of the lid actuator 10 and lid 6 in the closed and open positions, respectively, and illustrate how the lid actuator 10 may be used to cause movement of the lid 6 yet be capable of independent movement. In FIG. 5, the lid 6 is in the closed position and the lid actuator 10 is in a clockwise position with an engagement portion 12 of the lid actuator 10 positioned near (may or may not be in contact with) a contact surface 61 of the lid 6. The engagement portion 12 and the contact surface 61 may touch but are not coupled together, and thus may move independently of each other. When the lid actuator 10 is moved counterclockwise about the pivot 11, such as by a user engaging the handle portion 13 with a finger, the engagement portion 12 engages the contact surface 61 and drives the lid 6 to move about the pivot 6a to the open position shown in FIG. 6. A spring 62 or other suitable resilient member may be included to bias the lid 6 to move, for example, to the closed position. In this embodiment, the spring 62 is a coil spring located at the pivot 6a for the lid 6, but the resilient member may be positioned in any suitable way, including away from the pivot 6a.

The contact surface 61 and the engagement portion 12 may be arranged to allow the engagement potion 12 to slide or otherwise move relative to the contact surface 61 as the lid actuator 10 drives the lid 6 from the closed to the open position. That is, as the lid actuator and lid rotate around their respective pivots, the engagement portion 12 and the contact surface 61 move along different arcuate pathways. In this illustrative embodiment, the contact surface 61 is generally flat, and the engagement portion 12 is rounded, allowing the engagement portion 12 to slide and/or rotate relative to the contact surface. However, other configurations to allow for relative motion of the engagement portion 12 and the contact surface 61 are possible.

In another aspect of the invention, the lid actuator may be arranged to lock the lid in a position, such as the open position, without requiring a user to maintain engagement with the lid actuator. For example, as can be seen in FIG. 6, the engagement portion 12 may engage the contact surface 61 so that an "over-center" condition exists, effectively locking the lid 6 in position. That is, when the lid 6 is locked in the open position, a line of force exerted by the contact surface 61 on the engagement portion 12 may be oriented so as to pass either near or below the pivot 11, preventing the force of the spring 62 from closing the lid 6 until the lid actuator 10 is rotated clockwise. The lid may be unlocked by a user engaging the finger loop and rotating the lid actuator 10 clockwise.

In another embodiment, if the pivot 11 for the lid actuator 10, the pivot 6a for the lid 6, or other element is suitably arranged, the lid 6 may be moved from a locked position by a user moving the lid directly. For example, if the embodiment of FIGS. 5 and 6 were arranged so that the pivot 11 was mounted in a slot that allowed the lid actuator 10 to move horizontally, a user could close the lid from a locked open position by pressing downward on the lid. Pressing downward on the lid would cause the lid actuator 10 and pivot 11 to move along the slot horizontally to the right (e.g., against the bias of a spring urging the lid actuator to move to the left), unlocking the lid and allowing it to move to the closed position. Other arrangements are possible, such as a hinged, folding or resilient engagement portion 12, etc.

In another aspect of the invention, a line connecting the pivot 11 for the lid actuator 10 and the engagement portion 12 may move from one side of a line connecting the pivot 11 and the pivot 6a to another side of the line as the lid actuator causes the lid to move. For example, in FIG. 5, a line connecting the pivot 11 to the engagement portion 12 is above a line connecting the two pivots 11 and 6a. After the lid actuator 10 is moved to the position in FIG. 6, the line connecting the pivot 11 to the engagement portion 12 is below the line connecting the two pivots 11 and 6a.

It will be understood that the arrangement shown in these illustrative embodiments may be changed in accordance with aspects of the invention. For example, a resilient member may bias the lid to move from the closed to the open position, and the lid actuator may drive the lid to the closed position. The lid actuator may also lock the lid in the closed position. Therefore, a user may lock the lid in a closed position while the water is heating, and when the water is sufficiently heated, may disengage the lock, allowing the lid to open, e.g., to allow serving of hot water or stopping a steam whistle in the lid from sounding. The lid actuator may also be used to drive the lid both from the closed to the open position as well as from the open to the closed position, rather than only in one direction. Also, the lid actuator may function as a carrying handle for the kettle, e.g., opening the lid when the handle is gripped and the kettle lifted, and allowing the lid to be closed when the kettle is placed down and the handle is pressed. The lid actuator may also be made longer than that shown in FIGS. 1-6, e.g., so the handle portion 13 of the lid actuator may be gripped by two or more fingers when gripping the handle 5. Also, the lid actuator may have a partial finger loop as shown in FIGS. 1-6 or may have a closed loop to receive one or more of the user's fingers.

The container 2 may be made of any suitable material, such as one that is highly thermally conductive and has a relatively high melting point, such as stainless steel, copper, aluminum or other metals. The container 2 may have any suitable size or shape and may be made from one unitary piece, or as an assembly of two or more pieces. In this illustrative embodiment, the container 2 has an approximately cylindrical shape with a rounded top portion 3 and a substantially flat bottom portion 4. However, the shape, size or other arrangement of the container 2 may be changed in any suitable way. In this illustrative embodiment, the top portion 3 may be made of a different material or combination of materials than a lower portion of the container 2, or even the substantially flat bottom portion 4. For example, the top portion 3 may be made of a suitable plastic or other material having a relatively low thermal conductivity. In contrast, the lower section of the container 2 may be made of a material having a higher thermal conductivity, such as a metal. For example, the lower portion of the container 2 may have bottom portion made of a highly conductive material, such as copper, aluminum, or stainless steel. The top portion 3, such as one made of a nylon or other suitable plastic, may be permanently secured to the lower portion. Of course, in other aspects of the invention, it will be understood that the lower portion and the top portion of the container may be made of a single type of material, such as stainless steel, and may be made from a single unitary part.

In another aspect of the invention, a spout 9 of the kettle 1 through which liquid may be poured from the container 2 may be integrally formed with the top portion 3. That is, the top portion and the spout 9 may be molded from a suitable plastic material to form a single piece, or may otherwise be attached together. Similarly, in another aspect of the invention, the handle 5 may be integrally formed with the spout 9 and/or with the top portion 3. It should be appreciated, however, that these aspects of the invention are not required, and the spout and/or handle may be made separate from the top portion 3 or each other and may be secured to the container 2 or otherwise formed in other ways. For example, the spout 9 may extend from a sidewall of the container 2 as is known in the art. Likewise, the handle 5 may be attached to other portions of the container 2 and may be separate from the spout. Also, the handle 5 need not be fixed in place, but instead may, for example, be pivotally mounted to the container 2 so that the handle 5 may fold down, e.g., for storage. The handle 5 may be folded up to extend over the top of the container for use in carrying the kettle. The lid 6 may optionally include a whistle or other element to indicate that the water or other liquid has been suitably heated.

In another aspect of the invention, the container 2 may include an opening 7 that is offset to one side of the handle 5. The figures show the opening 7, which is formed in the top portion 3 covered by a lid 8. As can be seen in FIG. 3, the opening 7 is offset from the handle 5 to allow easier filling of the container 2.

Having described particular embodiments of the invention in detail, various modifications and improvements will readily occur to those skilled in the art. Such modifications and improvements are intended to be part of this disclosure and within the spirit and scope of the invention. Accordingly, the foregoing description is by way of example only and the invention is defined by the following claims and their equivalents.

The invention claimed is:

1. A kettle for heating a liquid, comprising:
   a container constructed and arranged to hold an amount of liquid, the container having a substantially flat bottom portion;
   a spout connected to the container, the spout having an opening and being constructed and arranged to allow liquid to be poured from the container through the opening;
   a lid connected to the container and movable relative to the opening about a first pivot that is stationary relative to the container, the lid being movable between a closed position to at least partially cover the opening and an open position to at least partially uncover the opening, the lid including a contact surface;

a lid actuator connected to the container and movable relative to the opening about a second pivot that is stationary relative to the container, the lid actuator being movable between closed and open positions to cause the lid to move between the closed and open positions, respectively, the lid actuator including an engagement portion arranged, with the lid actuator in the open position, to engage with the contact surface of the lid and lock the lid in the open position;

wherein a first perpendicular distance between the substantially flat bottom and the first pivot is greater than a second perpendicular distance between the substantially flat bottom and the second pivot.

2. The kettle of claim 1, wherein the lid is pivotally mounted to the spout and the lid actuator is pivotally mounted to the spout.

3. The kettle of claim 1, further comprising a handle connected to the container, the handle being constructed and arranged to be gripped by a human hand and allow carrying of the container while holding the amount of liquid.

4. The kettle of claim 3, wherein the handle generally extends above a top portion of the container.

5. The kettle of claim 3, wherein the handle is connected to the container at only one end so as to be cantilevered.

6. The kettle of claim 3, wherein the handle is connected to the container via the spout.

7. The kettle of claim 3, wherein the lid actuator is positioned between the handle and a top portion of the container.

8. The kettle of claim 3, wherein the lid actuator is arranged to be gripped and moved by a user's hand when gripping the handle.

9. The kettle of claim 1, further comprising a resilient member that biases the lid to move toward the closed position.

10. The kettle of claim 1, wherein a line connecting the second pivot and the engagement portion moves from one side of a pivot line connecting the first and second pivot points to another side of the pivot line as the lid actuator is moved to cause the lid to move from the closed position to the open position.

11. The kettle of claim 1, wherein the engagement portion contacts the lid contact surface to move the lid between a closed position to an open position.

12. The kettle of claim 1, wherein the lid and lid actuator are capable of independent movement.

13. The kettle of claim 1, wherein the lid actuator has a finger loop to engage with a user's finger.

14. The kettle of claim 1, further comprising a resilient member that biases the lid actuator to a position in which the lid is movable to the closed position.

15. The kettle of claim 1, wherein the container is constructed and arranged to transmit heat from an external source to heat liquid in the container.

16. A kettle for heating a liquid, comprising:
a container constructed and arranged to hold an amount of liquid, the container having a substantially flat bottom portion;
a spout connected to the container, the spout having an opening and being constructed and arranged to allow liquid to be poured from the container through the opening;
a lid connected to the container and movable relative to the opening about a first pivot that is stationary relative to the container, the lid being movable between a closed position to at least partially cover the opening and an open position to at least partially uncover the opening, the lid including a contact surface; and
a lid actuator connected to the container and movable relative to the opening about a second pivot, that is stationary relative to the container, between closed and open positions to cause the lid to move between the closed and open positions, respectively, the lid actuator being capable of movement independent of the lid and including an engagement portion arranged, with the lid actuator in the open position, to engage with the contact surface of the lid and lock the lid in the open position.

17. The kettle of claim 16, wherein the first pivot is a greater perpendicular distance away from the flat bottom portion than the second pivot at which the lid actuator is pivotally mounted.

18. The kettle of claim 17, wherein a line connecting the second pivot and the engagement portion moves from one side of a pivot line connecting the first and second pivot points to another side of the pivot line as the lid actuator is moved to cause the lid to move from the closed position to the open position.

19. The kettle of claim 16, further comprising a handle connected to the container, the handle being constructed and arranged to be gripped by a human hand and allow carrying of the container while holding the amount of liquid.

20. The kettle of claim 19, wherein the handle generally extends above a top portion of the container.

21. The kettle of claim 19, wherein the handle is connected to the container at only one end so as to be cantilevered.

22. The kettle of claim 19, wherein the handle is connected to the container via the spout.

23. The kettle of claim 19, wherein at least a portion of the lid actuator is positioned below the handle.

24. The kettle of claim 19, wherein the lid actuator is arranged to be gripped and moved by a user's hand when gripping the handle.

25. The kettle of claim 16, further comprising a resilient member that biases the lid to move toward the closed position.

26. The kettle of claim 16, wherein the lid is pivotally mounted to the spout and the lid actuator is pivotally mounted to the spout.

27. The kettle of claim 16, wherein the engagement portion contacts the lid contact surface to move the lid from a closed position to an open position.

28. The kettle of claim 16, further comprising a resilient member that biases the lid actuator to a position in which the lid is movable to the closed position.

29. The kettle of claim 16, wherein the container is constructed and arranged to transmit heat from an external source to heat liquid in the container.

30. A kettle for heating a liquid, comprising:
a container constructed and arranged to hold an amount of liquid, the container having a substantially flat bottom portion;
a spout connected to the container, the spout having an opening and being constructed and arranged to allow liquid to be poured from the container through the opening;
a lid connected to the container and movable relative to the opening about a first pivot that is stationary relative to the container, the lid including a cover portion to at least partially cover the opening and a contact portion, the first pivot being positioned between the cover portion and the contact portion, the lid being movable between a closed position in which the cover portion at least partially covers the opening and an open position in which the cover portion at least partially uncovers the opening; and a lever connected to the container and movable relative to the opening about a second pivot that is stationary relative to the container, the lever having a handle portion and an engagement portion, the second pivot being positioned between the handle portion and the engagement portion, wherein the engagement portion of the lever is uncoupled from the contact portion of the lid, and movement of the handle portion of the lever causes the engagement portion to engage with and move the contact portion, thereby causing the lid to move between the closed and open positions, the engagement portion being arranged to engage with the contact portion to lock the lid in the open position.

31. The kettle of claim 30, wherein the engagement portion engages with the contact portion to establish an overcenter condition to lock the lid in the open position.

32. The kettle of claim 30, further comprising a handle connected to the container, the handle being constructed and arranged to be gripped by a human hand and allow carrying of the container while holding the amount of liquid, the handle being connected to the container at only one end so as to be cantilevered.

* * * * *